United States Patent
Lin et al.

(10) Patent No.: US 9,854,514 B2
(45) Date of Patent: Dec. 26, 2017

(54) USER EQUIPMENT, SMALL CELL AND OPERATION METHOD THEREOF

(71) Applicant: Institute for Information Industry, Taipei (TW)

(72) Inventors: Hsuan-Li Lin, Taipei (TW); Tsung-Yu Tsai, Tainan (TW); Chun-Che Chien, Taipei (TW); Shu-Tsz Liu, Taipei (TW); Yi-Hsueh Tsai, New Taipei (TW)

(73) Assignee: Institute For Information Industry, Taipei (TW)

( * ) Notice: Subject to any disclaimer, the term of this patent is extended or adjusted under 35 U.S.C. 154(b) by 62 days.

(21) Appl. No.: 14/494,550

(22) Filed: Sep. 23, 2014

(65) Prior Publication Data
US 2015/0094077 A1 Apr. 2, 2015

Related U.S. Application Data

(60) Provisional application No. 61/883,211, filed on Sep. 27, 2013.

(51) Int. Cl.
*H04Q 7/10* (2006.01)
*H04W 52/02* (2009.01)
(Continued)

(52) U.S. Cl.
CPC ....... *H04W 52/0206* (2013.01); *H04W 48/12* (2013.01); *H04W 84/045* (2013.01); *Y02B 60/50* (2013.01)

(58) Field of Classification Search
CPC ............. H04W 16/14; H04W 52/0206; H04W 52/0229; H04W 52/0235; H04W 52/0238;
(Continued)

(56) References Cited

U.S. PATENT DOCUMENTS

2011/0194493 A1* 8/2011 Centonza .......... H04W 52/0206
370/328
2012/0015657 A1* 1/2012 Comsa .............. H04W 36/0094
455/436
(Continued)

FOREIGN PATENT DOCUMENTS

CN 102316561 A 1/2012
WO 2012004663 A2 1/2012

OTHER PUBLICATIONS

Office Action to the corresponding Taiwanese Patent Application No. 103132051 rendered by the Taiwan Intellectual Property Office (TIPO) dated Dec. 22, 2015, 9 pages (including English translation).
(Continued)

*Primary Examiner* — Kathy Wang-Hurst
*Assistant Examiner* — Julio Perez
(74) *Attorney, Agent, or Firm* — Skaar Ulbrich Macari, P.A.

(57) ABSTRACT

A user equipment, a small cell and an operation method thereof are provided. The small cell includes a processor and a transceiver. The processor is configured to generate a maintaining downlink signal when the small cell is in an off-state. The maintaining downlink signal utilizes fewer radio resources compared to a normal downlink signal which is generated when the small cell is in an on-state. The transceiver is electrically connected to the processor and configured to continuously transmit the maintaining downlink signal when the small cell is in the off-state and receive an uplink signal from the user equipment. The processor further switches the small cell from the off-state to the on-state according to the uplink signal.

14 Claims, 12 Drawing Sheets

(51) Int. Cl.
*H04W 48/12* (2009.01)
*H04W 84/04* (2009.01)

(58) Field of Classification Search
CPC ......... H04W 52/0245; H04W 52/0241; H04W 24/04
USPC .................. 455/436, 440, 443, 444, 574
See application file for complete search history.

(56) References Cited

U.S. PATENT DOCUMENTS

| | | | | |
|---|---|---|---|---|
| 2012/0106423 | A1* | 5/2012 | Nylander | H04W 52/0241 |
| | | | | 370/311 |
| 2013/0235778 | A1 | 9/2013 | Maeder et al. | |
| 2013/0279430 | A1* | 10/2013 | Damnjanovic ... | H04W 52/0206 |
| | | | | 370/329 |
| 2014/0120893 | A1* | 5/2014 | Malladi | H04W 24/02 |
| | | | | 455/418 |
| 2014/0155046 | A1* | 6/2014 | Morrill | H04W 24/02 |
| | | | | 455/418 |

OTHER PUBLICATIONS

3GPP TSG RAN WG1 Meeting #74, R1-133456, Barcelona, Spain, Aug. 19-23, 2013, 4 pages.
3GPP TSG RAN WGI Meeting #72bis, R1-131163, Chicago, USA, Apr. 15-19, 2013, 3 pages.

* cited by examiner

USER EQUIPMENT, SMALL CELL AND OPERATION METHOD THEREOF

PRIORITY

This application claims the benefit of priority based on U.S. Provisional Application Ser. No. 61/883,211 filed on Sep. 27, 2013, which is hereby incorporated herein by reference in its entirety.

FIELD

The present invention relates to a user equipment (UE), a small cell and an operation method thereof. More specifically, the small cell of the present invention continuously generates a maintaining downlink signal when it is in an off-state, and is switched from the off-state to an on-state according to an uplink signal received from the user equipment.

BACKGROUND

With the advancement of wireless communication technologies in recent years, people's demand for communication and data transmission via wireless devices has increased. In order to extend the signal coverage or ease the network congestion, wireless network operators are actively setting up small cells in places where there is a dense population or the signal strength is poor.

In the current $3^{rd}$ Generation Partnership Project (3GPP) network protocol, a user equipment must be located within the signal coverage of a macro base station in order to know the presence of a small cell that is in an off-state via the macro base station. Furthermore, switching the small cell from the off-state to an on-state can only be accomplished by the macro base station via a backhaul network.

Accordingly, user equipments (especially those just started up or those having lost an effective connection) located out of the signal coverage of the macro base station can never know the presence of a small cell that is in the off-state. In addition, because switching of the small cell from the off-state to the on-state the small cell is triggered by the macro base station via the backhaul network in the conventional mechanism, there inevitably exists a delay.

In view of this problem, an urgent need exists in the art to provide an operation mechanism for a small cell which reduces the delay when the small cell is triggered to be switched from the off-state to the on-state and which allows a user equipment located out of the signal coverage of a macro base station to know the presence of the small cell.

SUMMARY

An objective of certain embodiments of the present invention includes providing a user equipment, a small cell and an operation method thereof. The small cell of the present invention can continuously transmit a maintaining downlink signal by use of fewer radio resources when it is in an off-state. An adjacent user equipment that receives the maintaining downlink signal can generate an uplink signal according to the maintaining downlink signal and transmit the uplink signal to the small cell so that the small cell can be switched from the off-state to an on-state by detecting the uplink signal. Accordingly, with the operation mechanism of the present invention, even a user equipment located out of the signal coverage of a macro base station can detect the small cell that is in the off-state, and then trigger the small cell to be switched from the off-state to the on-state. This can reduce the delay in triggering the small cell to be switched.

To achieve the aforesaid objective, certain embodiments of the present invention comprises a small cell. The small cell comprises a processor and a transceiver. The processor is configured to generate a maintaining downlink signal when it is determined that the small cell is in an off-state. The maintaining downlink signal utilizes fewer radio resources compared to a normal downlink signal which is generated when the small cell is in an on-state. The transceiver is electrically connected to the processor, and is configured to continuously transmit the maintaining downlink signal when the small cell is in the off-state and receive an uplink signal from a user equipment. The processor further switches the small cell from the off-state to the on-state according to the uplink signal.

Furthermore, certain embodiments of the present invention further include an operation method for a small cell. The small cell comprises a processor and a transceiver. The operation method is executed by the processor and comprises the following steps of: (a) generating a maintaining downlink signal when it is determined that the small cell is in an off-state, the maintaining downlink signal utilizing fewer radio resources compared to a normal downlink signal which is generated when the small cell is in an on-state; (b) enabling the transceiver to continuously transmit the maintaining downlink signal when the small cell is in the off-state; and (c) switching the small cell from the off-state to the on-state according to an uplink signal when the uplink signal is received by the transceiver from a user equipment.

Furthermore, in order to achieve the aforesaid objective, certain embodiments of the present invention include a user equipment. The user equipment comprises a transceiver and a processor. The transceiver receives a maintaining downlink signal from a small cell. The maintaining downlink signal utilizes fewer radio resources compared to a normal downlink signal which is generated when the small cell is in an on-state. The processor is electrically connected to the transceiver, and is configured to generate an uplink signal according to the maintaining downlink signal and enable the transceiver to transmit the uplink signal to the small cell so as to switch the small cell from the off-state to the on-state in response to the uplink signal.

The detailed technology and preferred embodiments implemented for the subject invention are described in the following paragraphs accompanying the appended drawings for people skilled in this field to well appreciate the features of the claimed invention.

DETAILED DESCRIPTION

Hereinbelow, the present invention will be explained with reference to example embodiments thereof. The present invention includes a user equipment, a small cell and an operation method thereof. It should be appreciated that, the example embodiments of the present invention are not intended to limit the present invention to any specific examples, embodiments, environment, applications or implementations as described in these embodiments. Therefore, description of these example embodiments is only for purpose of illustration rather than to limit the present invention, and the scope of this application shall be governed by the claims. In addition, in the following embodiments and drawings, elements not directly related to the present invention are omitted from depiction; and dimensional relationships among individual elements in the following drawings are illustrated only for ease of understanding but not to limit the actual scale.

Figure 1:
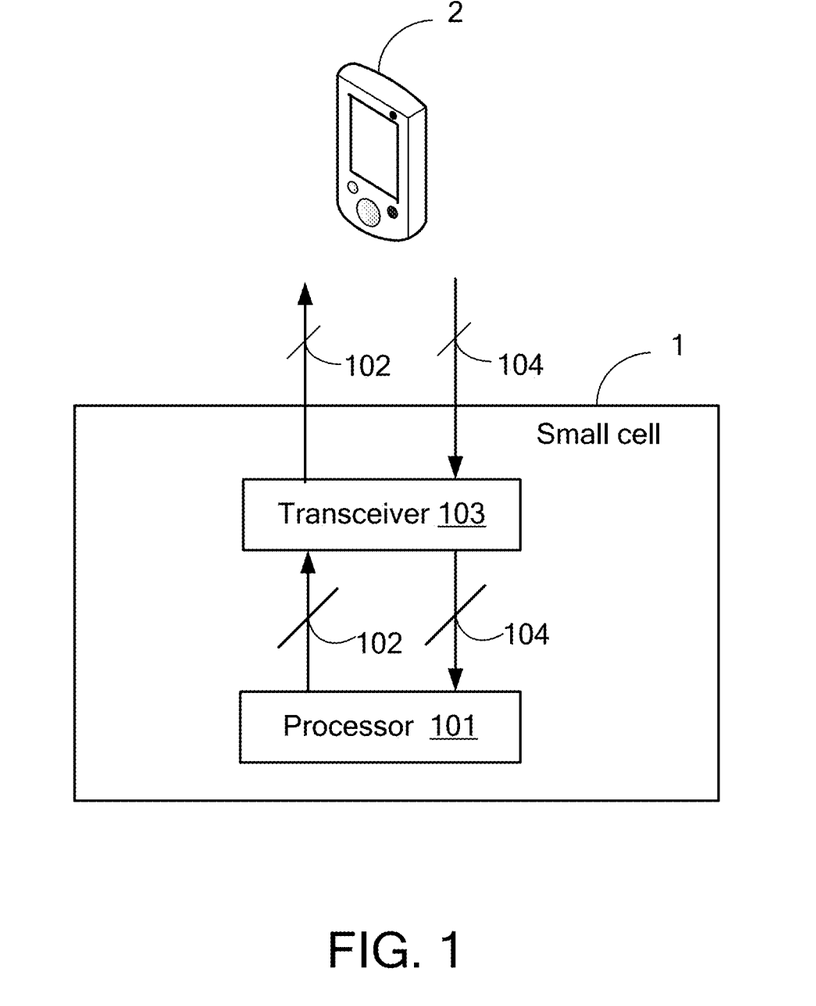
FIG. 1 is a schematic view illustrating the operation of a small cell 1 in a first embodiment of the present invention.
Figure 2:
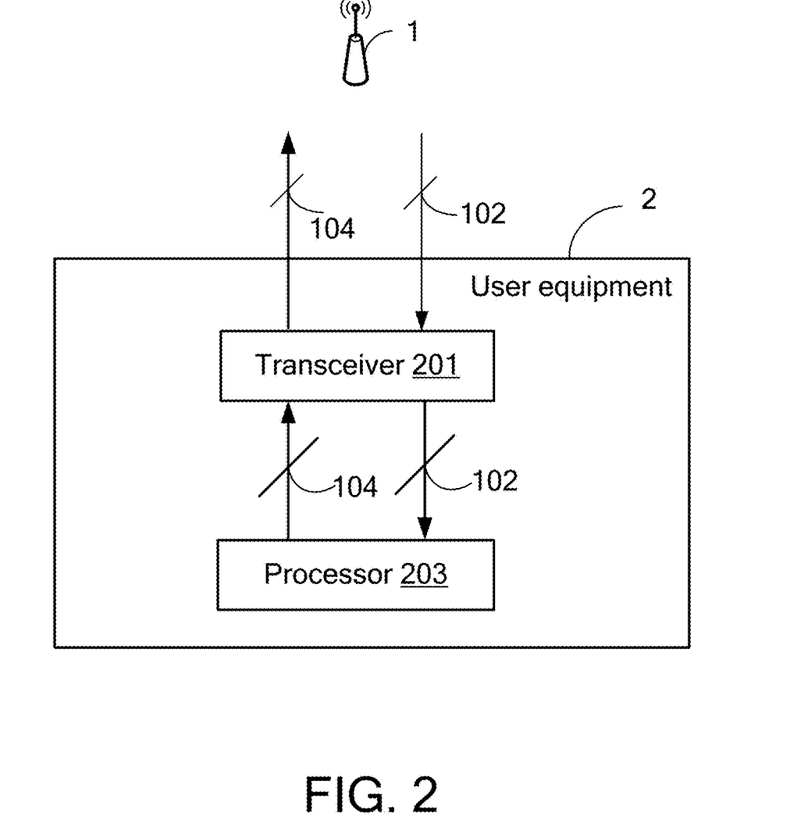
FIG. 2 is a schematic view illustrating the operation of a user equipment 2 in the first embodiment of the present invention.

A first embodiment of the present invention is shown in FIG. 1 and FIG. 2. FIG. 1 is a schematic view illustrating how a small cell 1 of the present invention operates, and FIG. 2 is a schematic view illustrating how a user equipment 2 of the present invention operates. For example, the small cell 1 may be a femtocell, a picocell, a microcell or the like. As shown in FIG. 1, the small cell 1 comprises a processor 101 and a transceiver 103. When the small cell 1 is in an off-state, the processor 101 will generate a maintaining downlink signal 102 when it is determined that the small cell 1 is in the off-state. The maintaining downlink signal 102 occupies fewer radio resources as compared to a normal downlink signal (not depicted) which is generated when the small cell 1 is in an on-state.

Specifically, in the $3^{rd}$ Generation Partnership Project Long Term Evolution (3GPP LTE) network standard, the signal transmission is carried out in units of frames, and one frame comprises 10 subframes. In the conventional technology, when the small cell is in the on-state, the 10 subframes of each frame all carry information or signals, and when the small cell is in the off-state, no downlink signal is transmitted. However, the present invention differs from the conventional technology in that, in the maintaining downlink signal 102 that is generated and transmitted by the small cell 1 that is in the off-state, only a few subframes in each frame carry information or signals but not all the radio resources of the frame are occupied; and only a small proportion of resource blocks of these subframes are used.

For example, in the present invention, only a primary synchronization signal (PSS), a secondary synchronization signal (SSS), a reference signal (e.g., a cell-specific reference signal (CRS)), a physical broadcast channel (PBCH), a physical control format indicator channel (PCFICH) and a physical downlink control channel (PDCCH) of a first subframe and a PSS, an SSS, a reference signal, a PCFICH and a PDCCH of a sixth subframe of each of the frames will be transmitted or carry information in the maintaining downlink signal 102. In other words, in this example, only a part of the resource blocks of two subframes are used in a frame.

In this embodiment, the transmission period of the PSS and the SSS is 5 ms as defined by the 3GPP LTE standard, and the transmission period of the PBCH is 10 ms as defined by the 3GGP LTE standard. The CRS, the PCFICH and the PDCCH are transmitted only in subframes where a PSS, an SSS or a PBCH is transmitted, so they also have a transmission period of 5 ms. Accordingly, the aforesaid transmission manner can minimize the required number of CRSs and extend the transmission period of the PCFICH and the PDCCH, thereby reducing the signal interference between small cells.

The transceiver 103 is electrically connected to the processor 101, and is configured to continuously transmit the maintaining downlink signal 102 when the small cell 1 is in the off-state so that the user equipment 2 can detect whether there is any small cell 1 that is in the off-state around it. The user equipment 2 retrieves an uplink channel configuration parameter from the PDCCH, and then transmits an uplink signal 104 to the small cell 1 according to the uplink channel configuration parameter. Once the uplink signal 104 is received by the transceiver 103 from the user equipment 2, the processor 101 can switch the small cell 1 from the off-state to the on-state according to the uplink signal 104. For example, the uplink signal 104 has a physical random access channel (PRACH), and the processor 101 switches the small cell 1 from the off-state to the on-state when the signal energy of the PRACH is detected.

As shown in FIG. 2, there is shown a schematic view illustrating a user equipment 2 of the present invention. The user equipment 2 comprises a transceiver 201 and a processor 203. The transceiver 201 receives the maintaining downlink signal 102 from the small cell 1. As described above, the maintaining downlink signal 102 utilizes fewer radio resources as compared to a normal downlink signal (not depicted) which is generated when the small cell 1 is in the on-state. The processor 203 is electrically connected to the transceiver 201, and is configured to generate the uplink signal 104 according to the maintaining downlink signal 102 (i.e., according to the uplink channel configuration parameter carried by the PDCCH of the maintaining downlink signal 102), and enable the transceiver 201 to transmit the uplink signal 104 to the small cell 1 so as to switch the small cell 1 from the off-state to the on-state in response to the uplink signal 104.

Figure 3A:
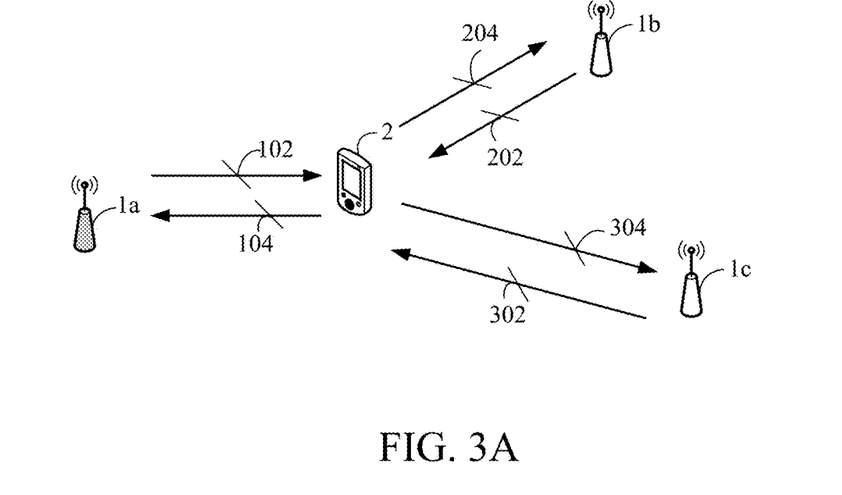
FIG. 3A and FIG. 3B depict two scenarios in a second embodiment of the present invention.
Figure 3B:
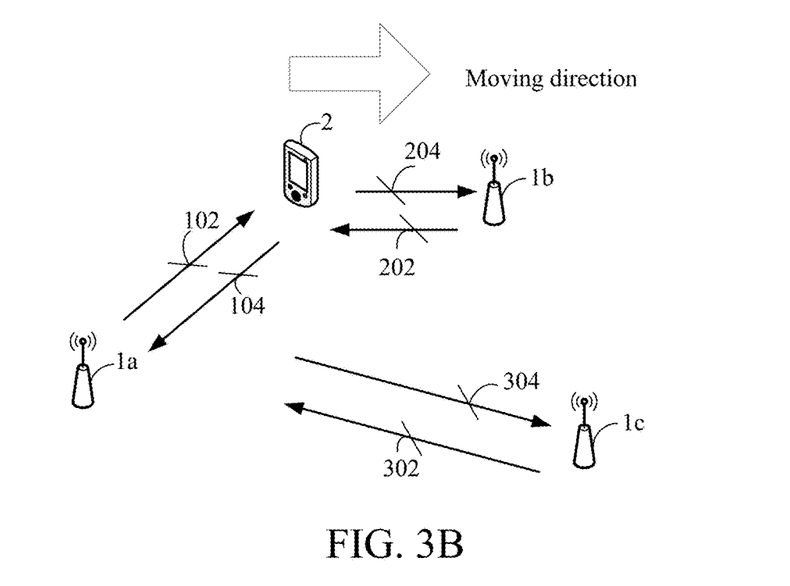

A second embodiment of the present invention is shown in FIG. 3A and FIG. 3B, which are schematic views depicting different scenarios. This embodiment is an extension of the first embodiment, so small cells 1a, 1b, and 1c shown in FIG. 3A and FIG. 3B are just the same as the small cell 1 described in the first embodiment. In the scenario shown in FIG. 3A, the small cells 1a, 1b, and 1c are all in the off-state, and can transmit maintaining downlink signals 102, 202, and 302 to the user equipment 2 respectively. The user equipment 2 can transmit uplink signals 104, 204, and 304 to the small cells 1a, 1b, and 1c respectively according to the uplink channel configuration parameters carried by the maintaining downlink signals 102, 202, and 302 respectively. The small cells 1a, 1b, and 1c can determine whether the received signal strengths of the uplink signals 104, 204, and 304 are larger than a threshold value respectively so as to determine whether to be switched from the off-state to the on-state or not.

Specifically, assume that the small cell 1a is just the small cell 1 of the present invention. Because the PRACH of the uplink signal 104 has signal energy, the processor 101 of the small cell 1a further determines whether the received signal strength of the PRACH is larger than a threshold value, and switches the small cell 1a from the off-state to the on-state when the received signal strength is larger than the preset threshold value. In this embodiment, the small cells 1a, 1b, and 1c can be switched to the on-state as long as the received signal strengths of the PRACHs that they receive are larger than the preset threshold value. Accordingly, in this embodiment, all of the small cells 1a, 1b, and 1c may be switched on (i.e., the received signal strengths of the PRACHs received by the small cells 1a, 1b, and 1c may be all larger than the threshold value), or only a part of the small cells or no small cell can be switched on.

In another implementation, the small cells 1a, 1b, and 1c can communicate with each other via a backhaul network (not depicted), and negotiate with each other according to the received signal strengths of the respective PRACHs to decide that only at least one of the small cells 1a, 1b, and 1c can be switched on. In addition, the backhaul network can also decide which one of the small cells must be switched on (e.g., switching on the small cell whose PRACH has the largest received signal strength) according to the received signal strengths of the PRACHs received by the small cells respectively.

FIG. 3B is another scenario in the second embodiment of the present invention. Assume that the small cell 1a is just the small cell 1 of the present invention and is in an on-state. When the user equipment 2 moves away from the small cell 1a towards the small cell 1b, the processor 101 of the small cell 1a can further switch the small cell 1a from the on-state to the off-state according to the received signal strength of the PRACH (e.g., when the received signal strength of the PRACH is smaller than the threshold value). On the other hand, because the user equipment 2 is closer to the small cell 1b, it is possible that the received signal strength of the PRACH received by the small cell 1b is larger than the threshold value and thus the small cell 1b may be switched from the off-state to the on-state. It should be appreciated that, in this embodiment, the same threshold value is used to determine whether a small cell is to be switched from the on-state to the off-state and whether the small cell is to be switched from the off-state to the on-state. However, in other embodiments, different threshold values may also be used to determine whether a small cell is to be switched from the on-state to the off-state and whether the small cell is to be switched from the off-state to the on-state, and these threshold values may be set according to factors including the actual environment.

Figure 4:
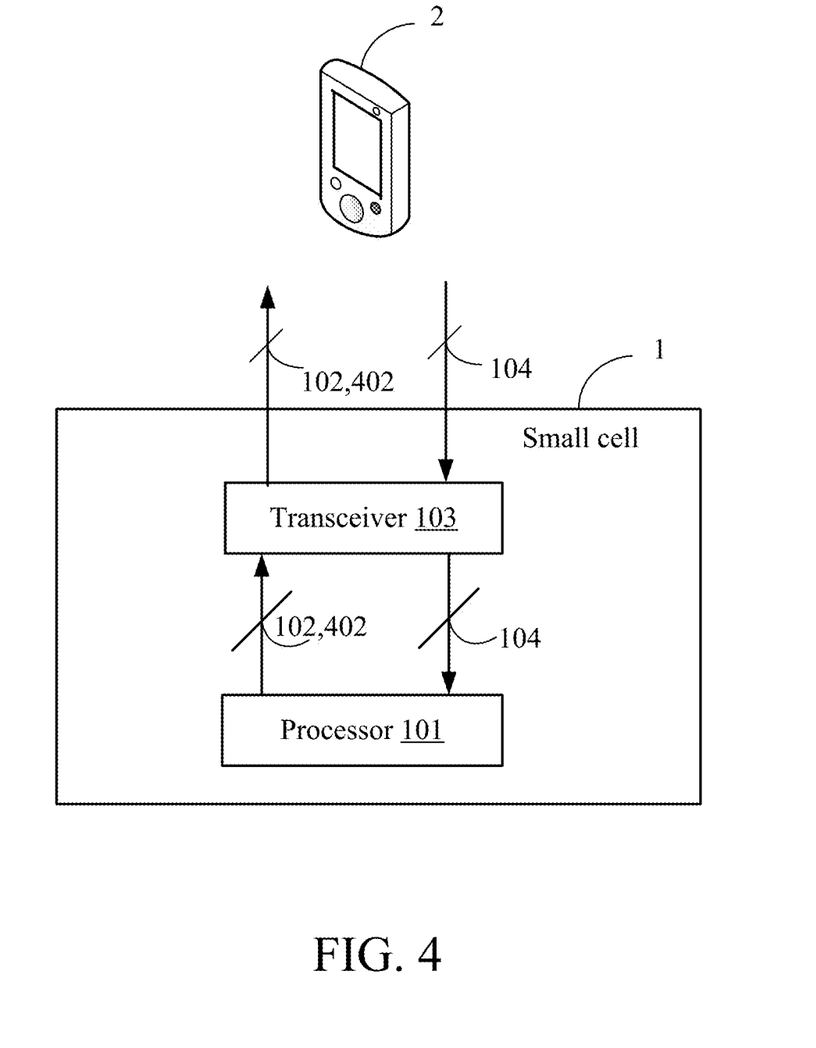
FIG. 4 is a schematic view illustrating the operation of the small cell 1 in a third embodiment of the present invention.

A third embodiment of the present invention is shown in FIG. 4, and is an extension of the second embodiment. When the small cell 1 is in the off-state, the processor 101 can firstly generate the maintaining downlink signal 102 according to a common cell identity, and generate a normal downlink signal 402 according to its own dedicated cell identity only when the small cell 1 is switched to the on-state. Specifically, because the PSS and the SSS are generated according to the cell identity, a plurality of small cells that are in the off-state all use the same common cell identity in this embodiment in order to reduce the signal interference between the maintaining downlink signals transmitted by these small cells that are in the off-state. Accordingly, the user equipment 2 located in the signal coverages of a plurality of small cells that are in the off-state will think that there is only one small cell that is in the off-state.

Next, each of the small cells that are in the off-state can decide whether to be switched to the on-state or not according to the received signal strength of the PRACH after having received the uplink signal 104 comprising the PRACH. Then, each of the small cells that are switched to the on-state will generate a normal downlink signal according to its own dedicated cell identity and transmit the normal downlink signal to the user equipment 2. It should be appreciated that, the common cell identity may be transmitted by the backhaul network to each of the small cells that are in the off-state, or be directly defined by the wireless network system.

Figure 5:
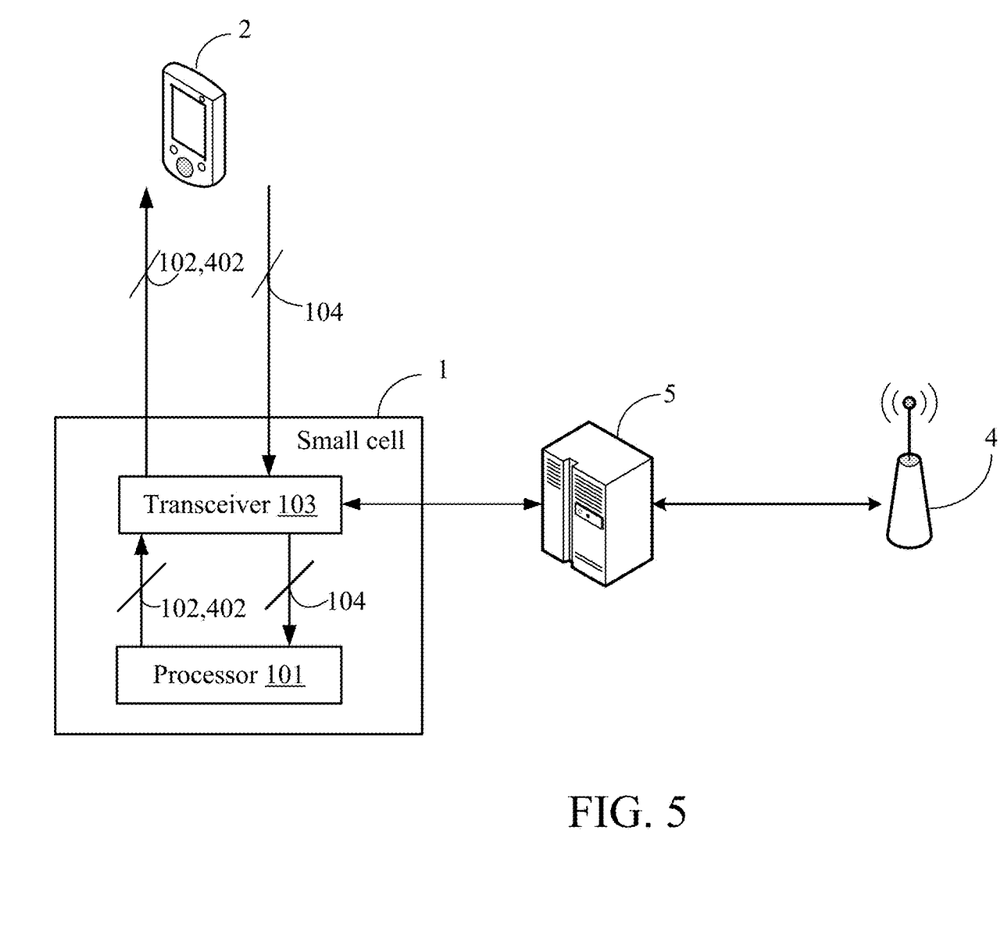
FIG. 5 is a schematic view illustrating the operation of the small cell 1 in a fourth embodiment and a fifth embodiment of the present invention.

FIG. 5 shows a fourth embodiment of the present invention, which is also an extension of the second embodiment. This embodiment differs from the third embodiment in that, the maintaining downlink signal 102 of the small cell 1 is generated according to an adjacent cell identity of the adjacent small cell 4. Specifically, when the small cell 1 is in the off-state, the transceiver 103 further receives the adjacent cell identity of the adjacent small cell 4 from the backhaul network 5. Here, the adjacent small cell 4 is in the on-state. Then, the processor 101 generates the maintaining downlink signal 102 according to the adjacent cell identity, and only when the small cell 1 is switched to the on-state, generates the normal downlink signal 402 according to its own dedicated cell identity.

Specifically, this embodiment is applicable to cases where the small cells in the off-state that are around a small cell that is in the on-state. When the user equipment moves to a small cell that is in the off-state or when the load of a small cell that is in the on-state is too high, the small cells that are in the off-state thereareound will be switched on. Therefore, the user equipment 2 located in the signal coverages of one or more small cells that are in the on-state and one or more small cells that are in the off-state will think that there are only small cells that are in the on-state.

The fifth embodiment of the present invention is shown in FIG. 5. When the small cell 1 is in the off-state, the transceiver 103 further receives a piece of related information of the user equipment 2 from the adjacent small cell 4 via the backhaul network 5. In this embodiment, because the adjacent small cell 4 is in the on-state and the user equipment 2 has been connected to the adjacent small cell 4, the adjacent small cell 4 has stored therein the related information of the user equipment 2. Accordingly, after the related information of the user equipment 2 is received by the transceiver 103 from the adjacent small cell 4, the processor 101 can then execute a pre-wakeup procedure according to the related information. For example, the related information may be the identity or other related messages of the user equipment 2. Accordingly, through the pre-wakeup procedure of the present invention, the time necessary for the user equipment 2 to be handed over to a small cell in the off-state (e.g., to be handed over from the small cell 4 to the small cell 1) can be shortened.

Figure 6A:
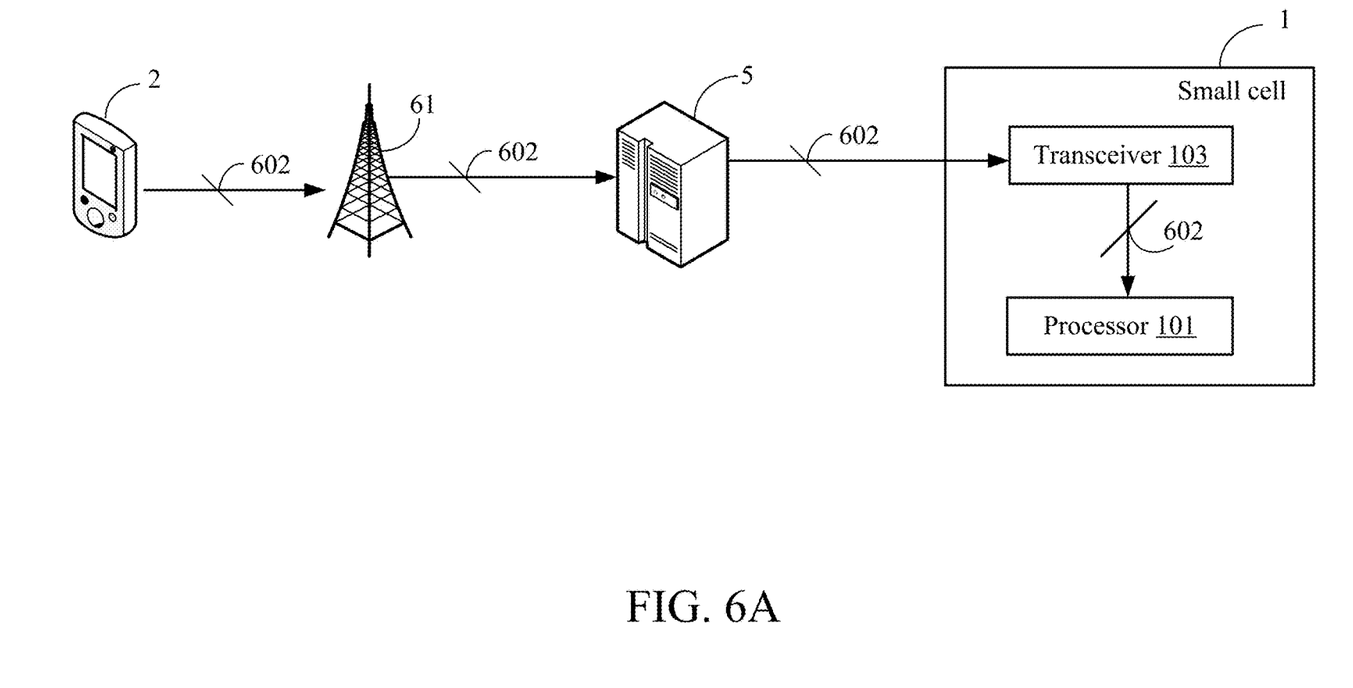
FIG. 6A is a schematic view illustrating the operation of the small cell 1 in a sixth embodiment of the present invention.

FIG. 6A is a schematic view illustrating a sixth embodiment of the present invention. As shown in FIG. 6A, the user equipment 2 of this embodiment further has a storage module (not depicted) to store a small cell map. Specifically, the small cell map may be stored by the user equipment 2 beforehand, or may be acquired in real time by means of the location service provided by the 3GPP. The user equipment 2 may, according to the geographical location thereof, transmit a wakeup signal 602 to the small cell 1 via a macro base station 61 and the backhaul network 5. Therefore, the transceiver 103 of the small cell 1 further receives the wakeup signal 602, and the processor 101 further switches the small cell 1 from the off-state to the on-state according to the wakeup signal 602.

Figure 6B:
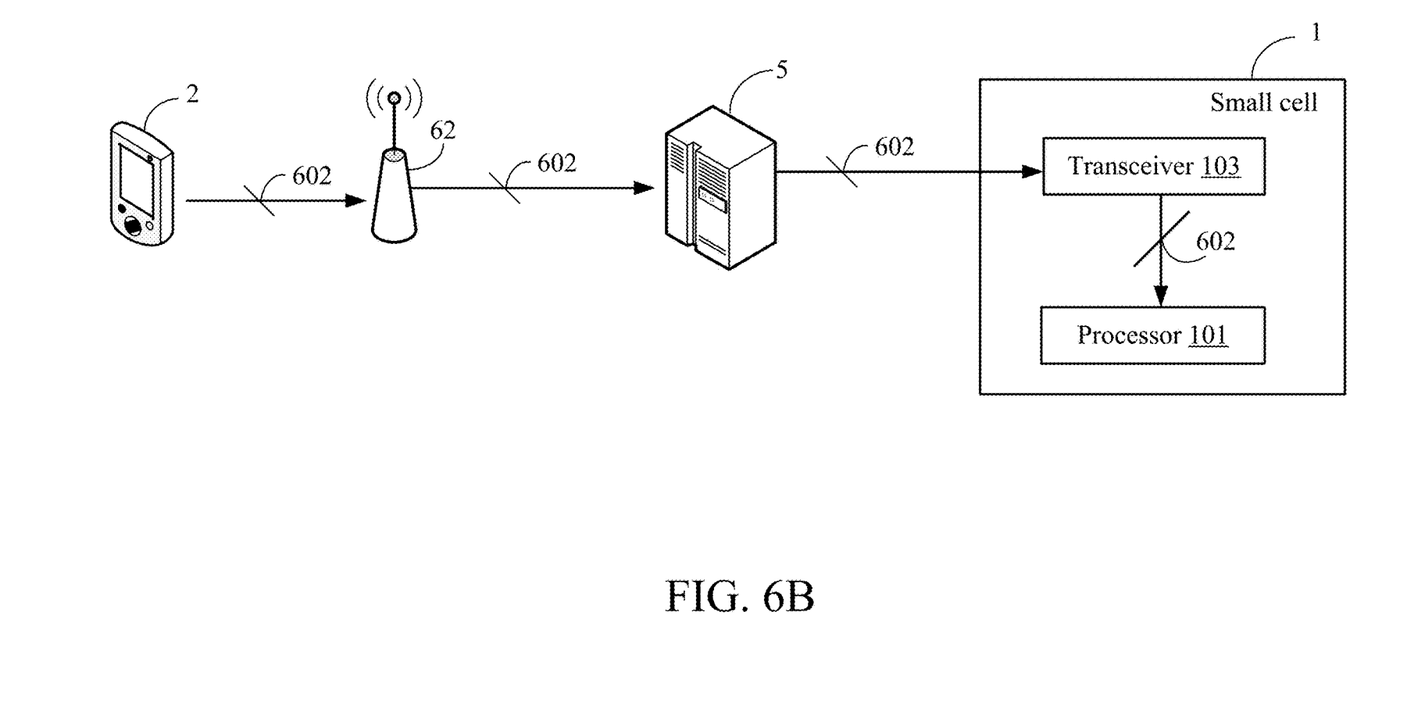
FIG. 6B is a schematic view illustrating the operation of the small cell 1 in an embodiment of the present invention.

The moving user equipment 2 can found the small cells in the off-state that are in the moving path thereof according to the small cell map so that the wakeup signal 602 is transmitted to switch on these small cells beforehand. In addition, the small cell map may also comprise the identity of each of the small cells to assist the user equipment 2 in identifying the small cells so that the probability of errors in obtaining cell identities based on the PSS and the SSS can be reduced. In another embodiment, as shown in FIG. 6B, the user equipment 2 may also transmit the wakeup signal 602 to the small cell 1 via another small cell 62 and the backhaul network 5.

Figure 7:
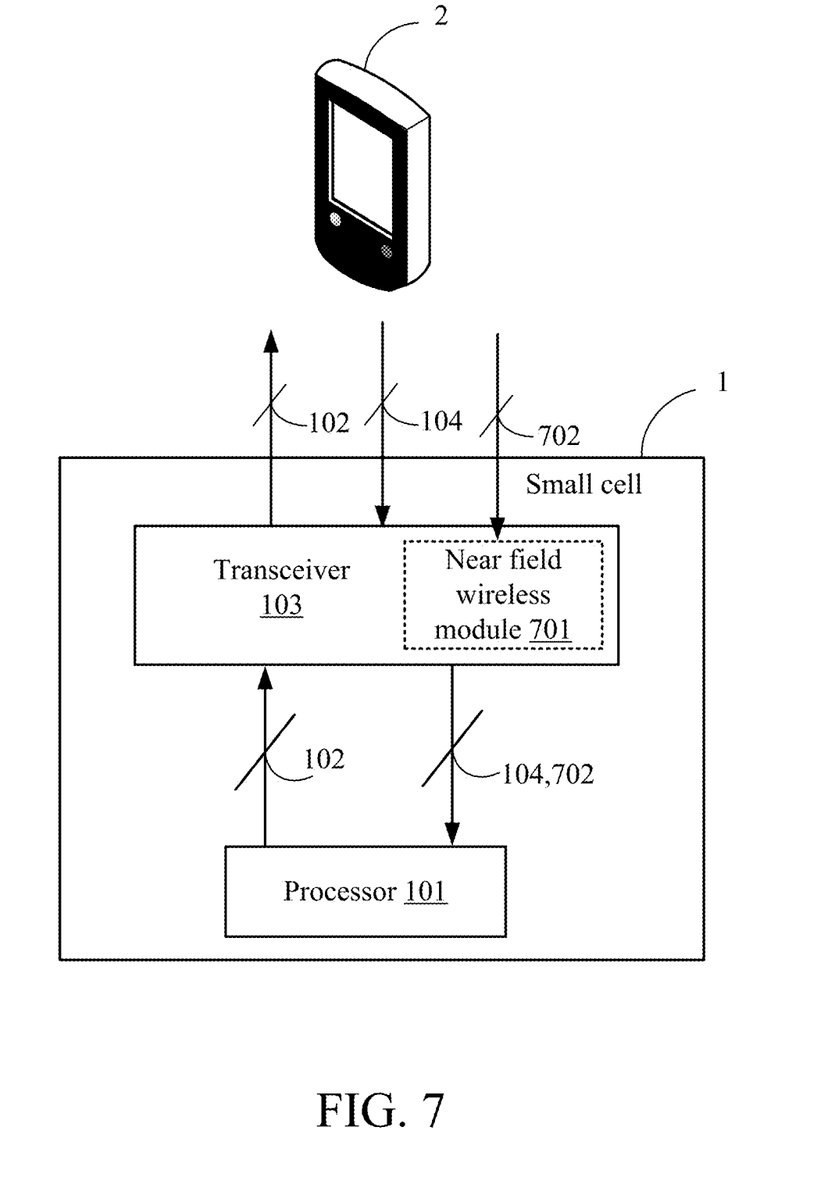
FIG. 7 is a schematic view illustrating the operation of the small cell 1 in a seventh embodiment of the present invention.

A seventh embodiment of the present invention is shown in FIG. 7. In this embodiment, the transceiver 103 of the small cell 1 further comprises a near field wireless transmission module 701. The near field wireless transmission module 701 receives a near field wireless signal 702 from the user equipment 2, so the processor 101 can further switch the small cell 1 from the off-state to the on-state according to the near field wireless signal 702. For example, the near field wireless transmission module 701 may be a Bluetooth wireless module, a near field communication (NFC) wireless module, a Wi-fi module or any module that has the function of short range wireless communication. Therefore, when the small cell 1 and the user equipment 2 both have a near field wireless communication module 701, the user equipment 2 can further switch on the small cell 1 by transmitting the near field wireless signal 702 to the small cell 1.

Figure 8A:
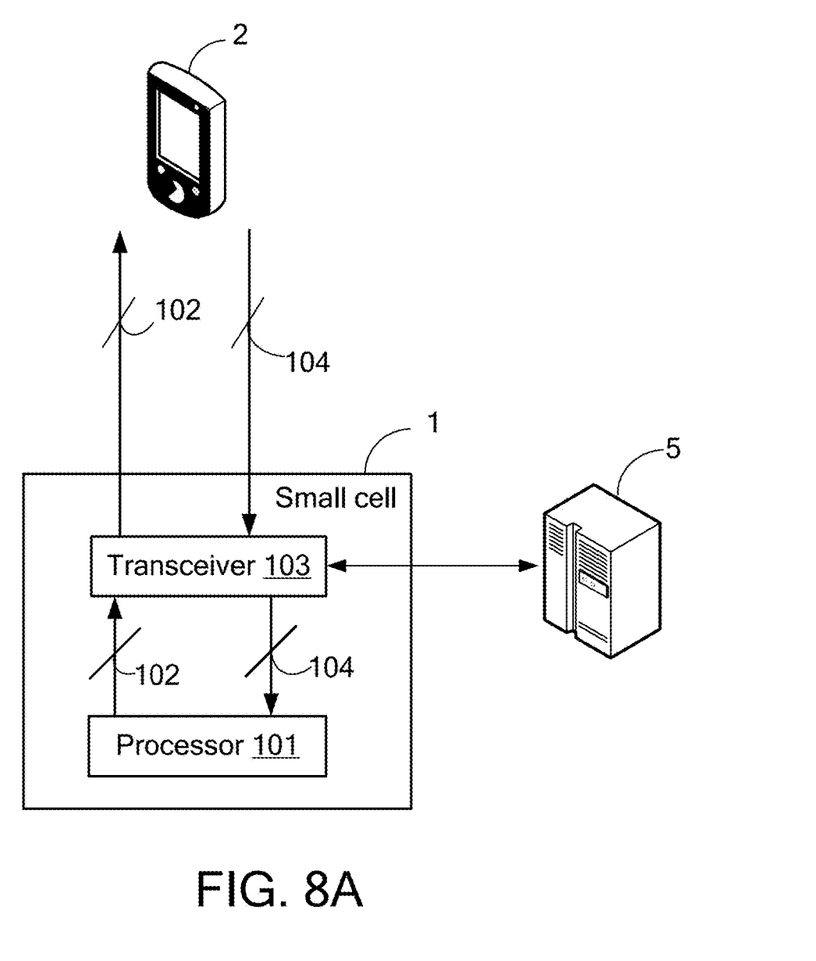
FIG. 8A is a schematic view illustrating the operation of the small cell 1 in an eighth embodiment of the present invention.
Figure 8B:
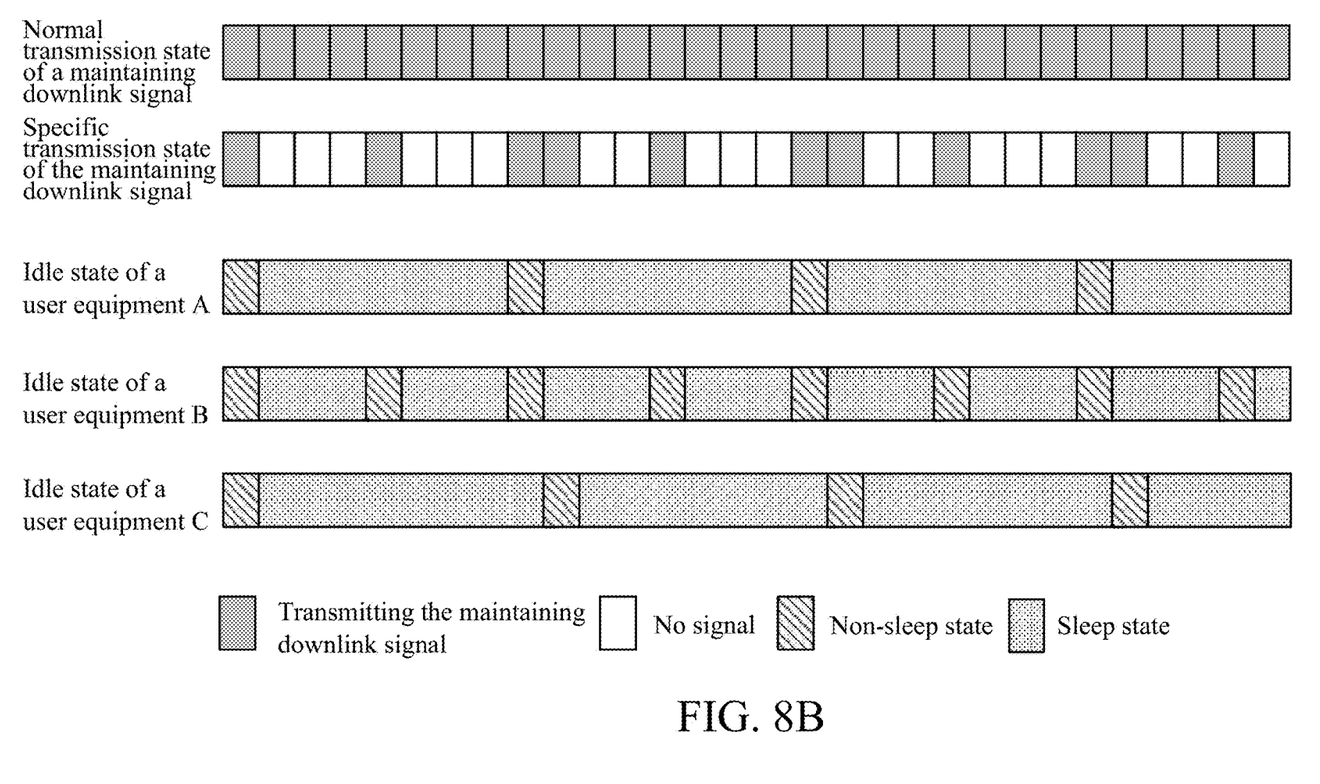
FIG. 8B is a schematic view illustrating the transmission of a maintaining downlink signal in the eighth embodiment of the present invention.

An eighth embodiment of the present invention is shown in FIG. 8A and FIG. 8B. In this embodiment, the transceiver 103 further receives a piece of idle user equipment information from the backhaul network 5. It should be appreciated that, the idle user equipment information provides information about the off-periods of different user equipments. When the small cell 1 is in the off-state, the processor 101 further enables the transceiver 103 to transmit the maintaining downlink signal 102 during a plurality of specific time intervals according to the idle user equipment information. In other words, through the idle user equipment information, the small cell 1 can stop transmitting the maintaining downlink signal 102 to save power when all the user equipments are in the off-state, and transmit the maintaining downlink signal 102 only when at least one of the user equipments is in the on-state.

For example, as shown in FIG. 8B, a user equipment A, a user equipment B and a user equipment C are all in an idle state, but have different sleep cycles. When the small cell 1 is in the off-state, the maintaining downlink signal is transmitted in a normal transmission state if the sleep state of the user equipment is not considered; and on the contrary, the maintaining downlink signal is transmitted in a specific transmission state if the sleep state of the user equipment is considered.

Figure 9:
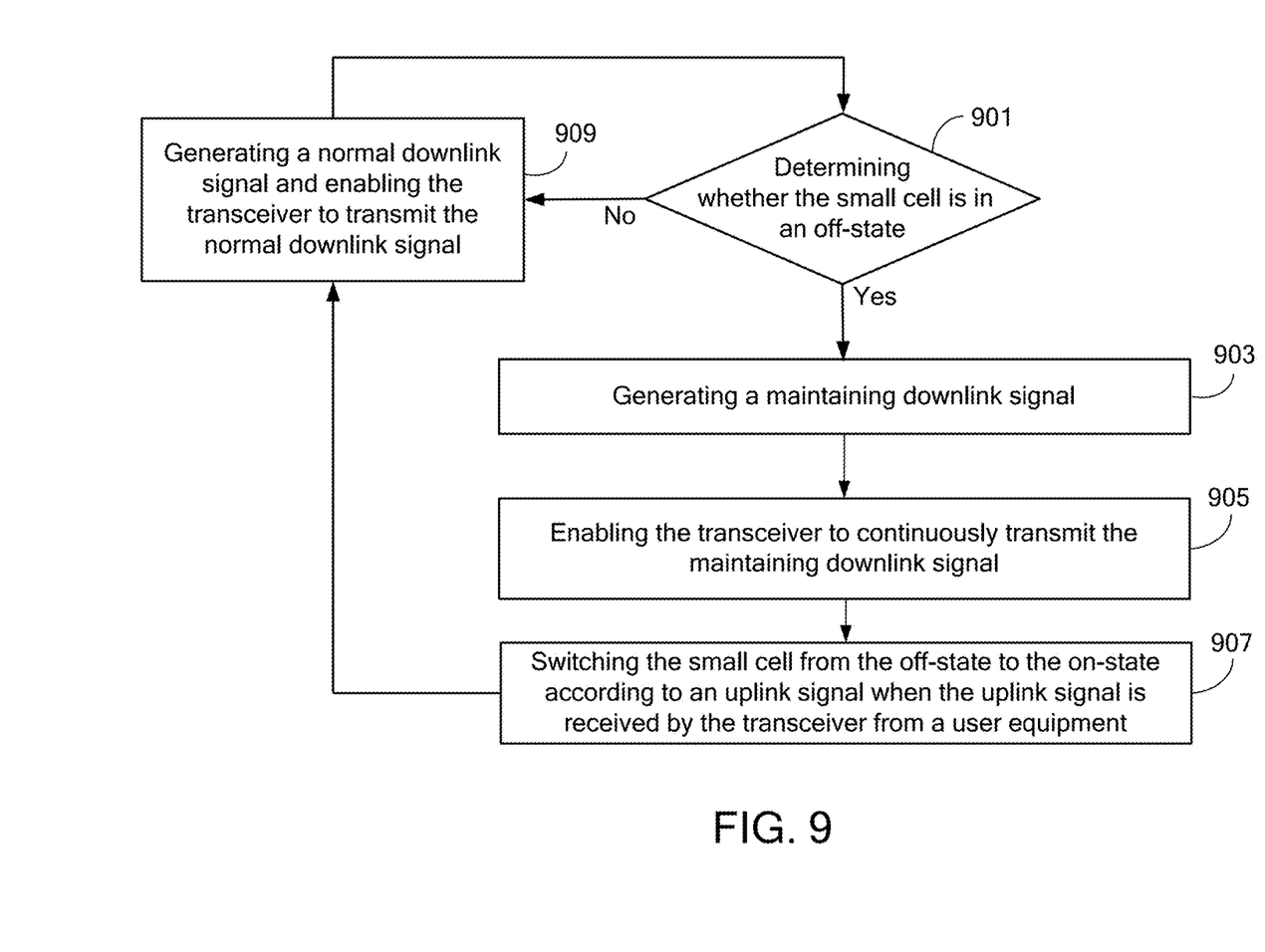
FIG. 9 is a flowchart diagram illustrating an operation method of a small cell in a ninth embodiment of the present invention.

A ninth embodiment of the present invention is an operation method of a small cell, a flowchart diagram of which is shown in FIG. 9. The cell operation method of this embodiment can be applied to the small cells (e.g., the small cell 1) in all the aforesaid embodiments. The small cell 1 comprises a transceiver and a processor. The transceiver is electrically connected to the processor. The operation method of the present invention is executed by the processor.

Firstly, a step 901 is executed to determine whether the small cell is in an off-state. If the determination result is "yes", a step 903 is executed to generate a maintaining downlink signal; and if the determination result is "no", a step 909 is executed to generate a normal downlink signal and enable the transceiver to transmit the normal downlink signal. The maintaining downlink signal utilizes fewer radio resources than the normal downlink signal which is generated when the small cell is in an on-state.

Then, when the small cell is in the off-state, a step 905 is executed to enable the transceiver to continuously transmit the maintaining downlink signal. A step 907 is executed to switch the small cell from the off-state to the on-state according to an uplink signal when the uplink signal is received by the transceiver from a user equipment. Then, the step 909 is executed.

The maintaining downlink signal may consist of a synchronization signal, a reference signal, a PBCH, a PCFICH and a PDCCH. In addition, the uplink signal transmitted by the user equipment has a physical random access channel (PRACH).

Figure 10:
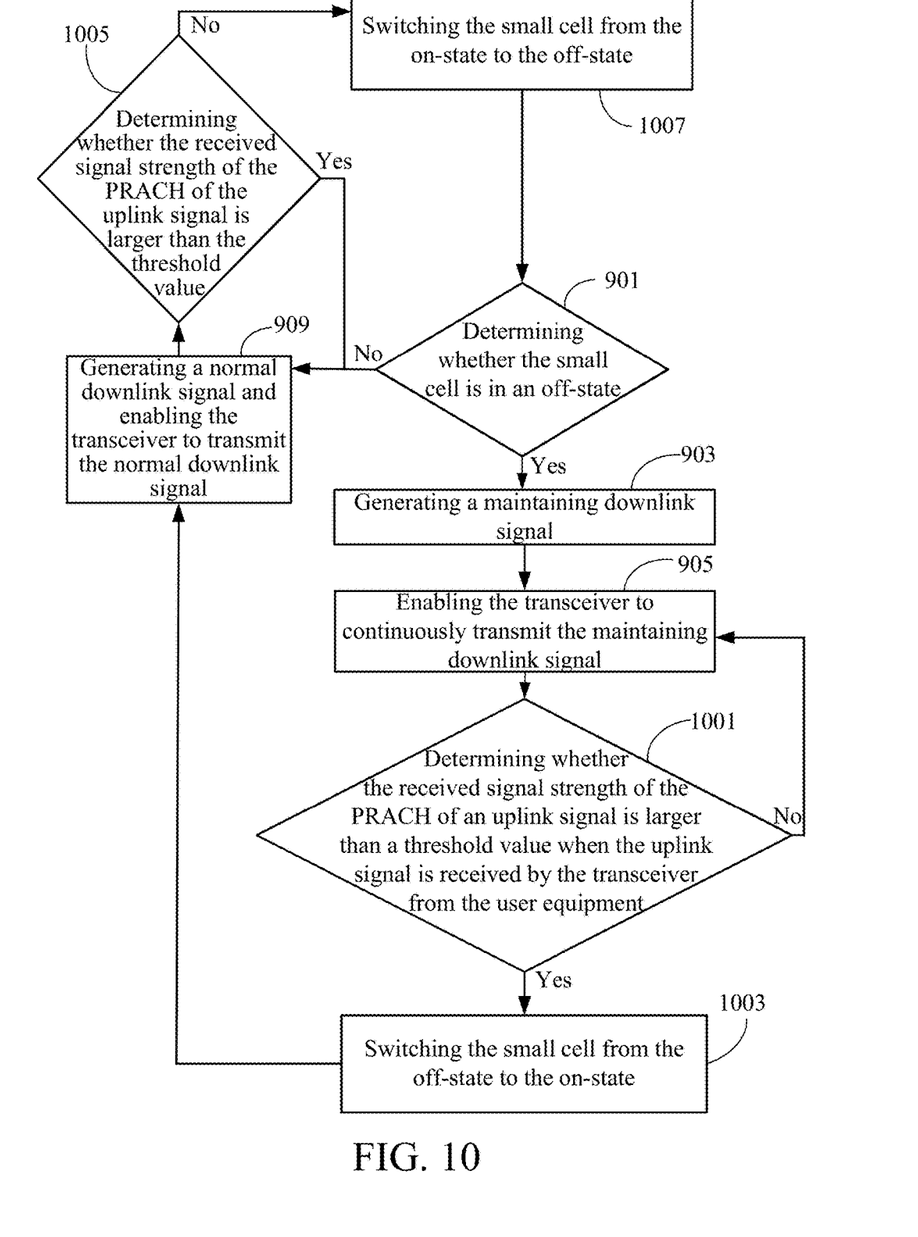
FIG. 10 is a flowchart diagram illustrating an operation method of a small cell in the ninth embodiment of the present invention.

In another embodiment, as shown in FIG. 10, the aforesaid step 907 may be replaced by a step 1001 and a step 1003, and the operation method of the present invention may further comprise a step 1005 and a step 1007. After the step 905, the step 1001 is executed to determine whether the received signal strength of the PRACH of the uplink signal received by the transceiver from the user equipment is larger than a threshold value. If the determination result is "yes", the step 1003 is executed to switch the small cell from the off-state to the on-state; and if the determination result is "no", the step 905 is executed again.

Then, after the step 909, the step 1005 is executed to determine whether the received signal strength of the PRACH of the uplink signal is larger than the threshold value. If the determination result is "yes", the step 909 is executed; and if the determination result is "no", the step 1007 is executed to switch the small cell from the on-state to the off-state. In other words, after the user equipment has moved away from the small cell, the small cell may become unable to receive the uplink signal or the received signal strength of the PRACH of the uplink signal may become smaller than the threshold value, and in this case, the small cell is switched back to the off-state to save power.

Additionally in other embodiments, when the small cell is in the off-state, the operation method of the present invention further comprises the following steps of: generating the maintaining downlink signal according to a common cell identity; and generating the normal downlink signal according to a dedicated cell identity after the small cell is switched to the on-state.

In other embodiments, when the small cell is in the off-state, the operation method of the present invention may further comprise the following steps if the transceiver further receives an adjacent cell identity of an adjacent small cell that is in the on-state from the backhaul network: generating the maintaining downlink signal according to the adjacent cell identity; and generating the normal downlink signal according to a dedicated cell identity after the small cell is switched to the on-state.

Additionally in other embodiments, when the small cell is in the off-state, the operation method of the present invention may further comprise the following steps if the transceiver further receives a piece of related information of the user equipment from an adjacent small cell that is in the on-state via the backhaul network: executing a pre-wakeup procedure according to the related information to reduce the time necessary for handing over the user equipment from the adjacent small cell to the small cell.

In another embodiment, the user equipment can store a small cell map so as to transmit a wakeup signal to the small cell via another small cell and a backhaul network or via a macro base station and the backhaul network according to a geographic location of the user equipment. Accordingly, the transceiver of the small cell further receives the wakeup signal, and the operation method of the present invention may further comprise the following step of: switching the small cell from the off-state to the on-state according to the wakeup signal.

Furthermore, in an embodiment, the transceiver may further comprise a nearfield wireless transmission module to receive a near field wireless signal from the user equipment. In this case, the operation method of the present invention may further comprise the following step of: switching the small cell from the off-state to the on-state according to the near field wireless signal. Additionally in other embodiments, the transceiver of the small cell may further receive a piece of idle user equipment information from the backhaul network, so the operation method of the present invention may further comprise the following step of: enabling the transceiver to transmit the maintaining downlink signal during a plurality of specific time intervals according to the idle user equipment information.

In addition to the aforesaid steps, the operation method of the present invention can also execute all the operations described in all the aforesaid embodiments and have all the corresponding functions. How this embodiment executes these operations and has these functions will be readily appreciated by those of ordinary skill in the art based on the disclosures of all the aforesaid embodiments, and thus will not be further described again.

According to the above descriptions, the operation mechanism of the small cell of the present invention allows a small cell that is in an off-state to transmit a maintaining downlink signal by use of few radio resources to let a user equipment know the presence of the small cell, and then the user equipment transmits an uplink signal to the small cell according to the maintaining downlink signal so as to switch the small cell from the off-state to an on-state.

In addition, the small cell can generate the maintaining downlink signal according to a common cell identity or an adjacent cell identity, which can reduce the signal interference between maintaining downlink signals transmitted by different small cells. Furthermore, the user equipment of the present invention can also switch the small cell from the off-state to the on-state via a connection with a backhaul network or through the near field wireless technology.

Accordingly, through the operation mechanism of the small cell of the present invention, even a user equipment that is out of the signal coverage of a macro base station can detect the presence of a small cell, and then further switch the small cell from the off-state to the on-state. On the other hand, even a user equipment is in the signal coverage of the macro base station, the delay in triggering the small cell to be switched from the off-state to the on-state can also be reduced.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A small cell for use in a communication system, comprising:
    a processor, being configured to generate a maintaining downlink signal according to a common cell identity or an adjacent cell identity of an adjacent small cell received from a backhaul network when it is determined that the small cell is in an off-state, the maintaining downlink signal utilizing fewer radio resources compared to a normal downlink signal which is generated when the small cell is in an on-state, the adjacent small cell being in the on-state; and
    a transceiver electrically connected to the processor, being configured to continuously transmit the maintaining downlink signal when the small cell is in the off-state and receive an uplink signal from a user equipment (UE);
    wherein the processor further switches the small cell from the off-state to the on-state according to the uplink signal, and generates the normal downlink signal according to a dedicated cell identity after the small cell is switched to the on-state, and
    wherein the uplink signal has a physical random access channel (PRACH), and the processor further determines whether a received signal strength of the PRACH is larger than a threshold value, and switches the small cell from the off-state to the on-state when the received signal strength is larger than the threshold value.

2. The small cell as claimed in claim 1, wherein the maintaining downlink signal consists of a synchronization signal, a reference signal, a physical broadcast channel (PBCH), a physical control format indicator channel (PCFICH) and a physical downlink control channel (PDCCH).

3. The small cell as claimed in claim 1, wherein when the small cell is in the on-state, the processor further switches the small cell from the on-state to the off-state according to the received signal strength of the PRACH.

4. The small cell as claimed in claim 1, wherein when the small cell is in the off-state, the transceiver further receives a piece of related information of the user equipment from the adjacent small cell via the backhaul network and the processor further executes a pre-wakeup procedure according to the related information.

5. The small cell as claimed in claim 1, wherein the user equipment further stores a small cell map so as to transmit a wakeup signal to the small cell via another small cell and the backhaul network or via a macro base station and the backhaul network according to a geographic location of the user equipment, the transceiver further receives the wakeup signal, and the processor further switches the small cell from the off-state to the on-state according to the wakeup signal.

6. The small cell as claimed in claim 1, wherein the transceiver further comprises a near field wireless transmission module so as to receive a near field wireless signal from the user equipment, and the processor further switches the small cell from the off-state to the on-state according to the near field wireless signal.

7. The small cell as claimed in claim 1, wherein the transceiver further receives a piece of idle user equipment information from the backhaul network, and the processor further enables the transceiver to transmit the maintaining downlink signal during a plurality of specific time intervals according to the idle user equipment information.

8. An operation method for a small cell, the small cell comprising a processor and a transceiver, the operation method being executed by the processor and comprising:

generating a maintaining downlink signal according to a common cell identity or an adjacent cell identity of an adjacent small cell received from a backhaul network when the small cell is in an off-state, wherein the maintaining downlink signal utilizes fewer radio resources compared to a normal downlink signal which is generated when the small cell is in an on-state and the adjacent small cell is in the on-state;

enabling the transceiver to continuously transmit the maintaining downlink signal when the small cell is in the off-state;

switching the small cell from the off-state to the on-state according to an uplink signal when the uplink signal is received by the transceiver from a user equipment, the uplink signal including a physical random access channel (PRACH);

generating the normal downlink signal according to a dedicated cell identity after the small cell is switched to the on-state;

determining whether a received signal strength of the PRACH is larger than a threshold value; and switching the small cell from the off-state to the on-state when the received signal strength is larger than the threshold value.

9. The operation method as claimed in claim 8, wherein the maintaining downlink signal consists of a synchronization signal, a reference signal, a PBCH, a PCFICH and a PDCCH.

10. The operation method as claimed in claim 8, wherein when the small cell is in the on-state, the operation method further comprising:

switching the small cell from the on-state to the off-state according to the received signal strength of the PRACH.

11. The operation method as claimed in claim 8, wherein when the small cell is in the off-state, the transceiver further receives a piece of related information of the user equipment from the adjacent small cell via the backhaul network, and the operation method further comprising:

executing a pre-wakeup procedure according to the related information.

12. The operation method as claimed in claim 8, wherein the user equipment further stores a small cell map so as to transmit a wakeup signal to the small cell via another small cell and the backhaul network or via a macro base station and the backhaul network according to a geographic location of the user equipment, and the transceiver further receives the wakeup signal, and the operation method further comprising:

switching the small cell from the off-state to the on-state according to the wakeup signal.

13. The operation method as claimed in claim 8, wherein the transceiver further comprises a near field wireless transmission module to receive a near field wireless signal from the user equipment, and the operation method further comprising:

switching the small cell from the off-state to the on-state according to the near field wireless signal.

14. The operation method as claimed in claim 8, wherein the transceiver further receives a piece of idle user equipment information from the backhaul network, and the operation method further comprising:

enabling the transceiver to transmit the maintaining downlink signal during a plurality of specific time intervals according to the idle user equipment information.

\* \* \* \* \*